United States Patent [19]

Spasuik

[11] 4,056,204

[45] Nov. 1, 1977

[54] BALE LOADING ASSEMBLY

[76] Inventor: Paul Spasuik, Box 146, Unity, Saskatchewan, Canada

[21] Appl. No.: 674,725

[22] Filed: Apr. 6, 1976

[30] Foreign Application Priority Data

Feb. 2, 1976 Canada .................................. 244776

[51] Int. Cl.² .............................................. B60D 1/00
[52] U.S. Cl. .................................. 214/83.3; 214/85.1
[58] Field of Search ............. 214/77 R, 144, 85, 85.1, 214/91 R, 92, DIG. 4, 130 R, 130 A, 130 B, 130 C, 83.3

[56]  References Cited

U.S. PATENT DOCUMENTS

| 2,814,401 | 11/1957 | Mendez | 214/85.1 |
| 2,848,125 | 8/1958 | Irvine | 214/144 |
| 3,013,676 | 12/1961 | Daniels, Jr. | 214/85.1 X |
| 3,066,810 | 12/1962 | Sartin | 214/92 |
| 3,667,621 | 6/1972 | Barlow | 214/77 R X |

Primary Examiner—Albert J. Makay
Attorney, Agent, or Firm—Cushman, Darby & Cushman

[57]  ABSTRACT

Bale loading assembly for round bales of hay or the like is arranged at the front end of a movable platform of the type having a downwardly and forwardly sloping ramp. The invention provides bale pulling means arranged to be lowered down, to engage the bale and move same up the ramp onto the platform. The pulling means thus renders the above type of movable platform suitable even for operation in a hilly terrain.

7 Claims, 6 Drawing Figures

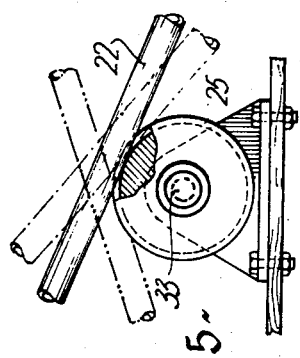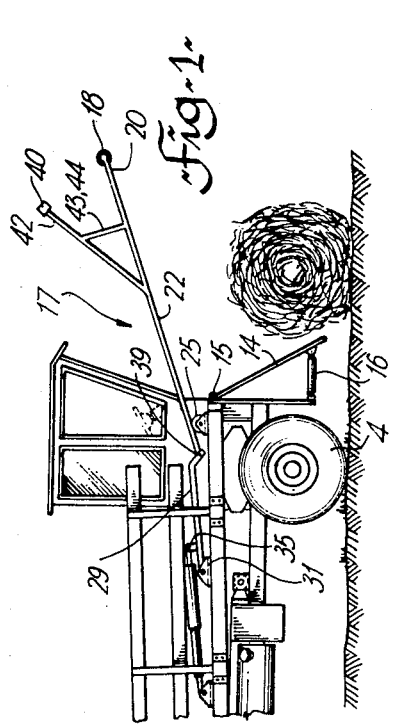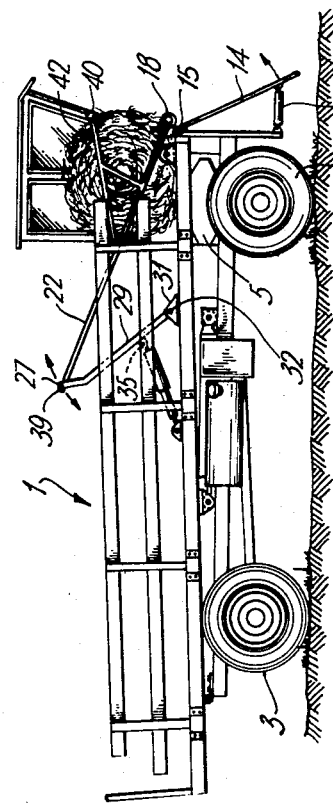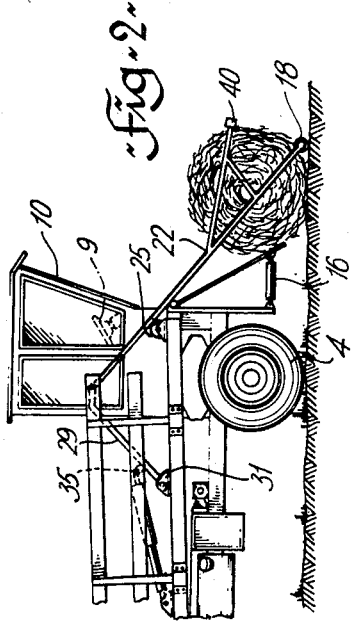

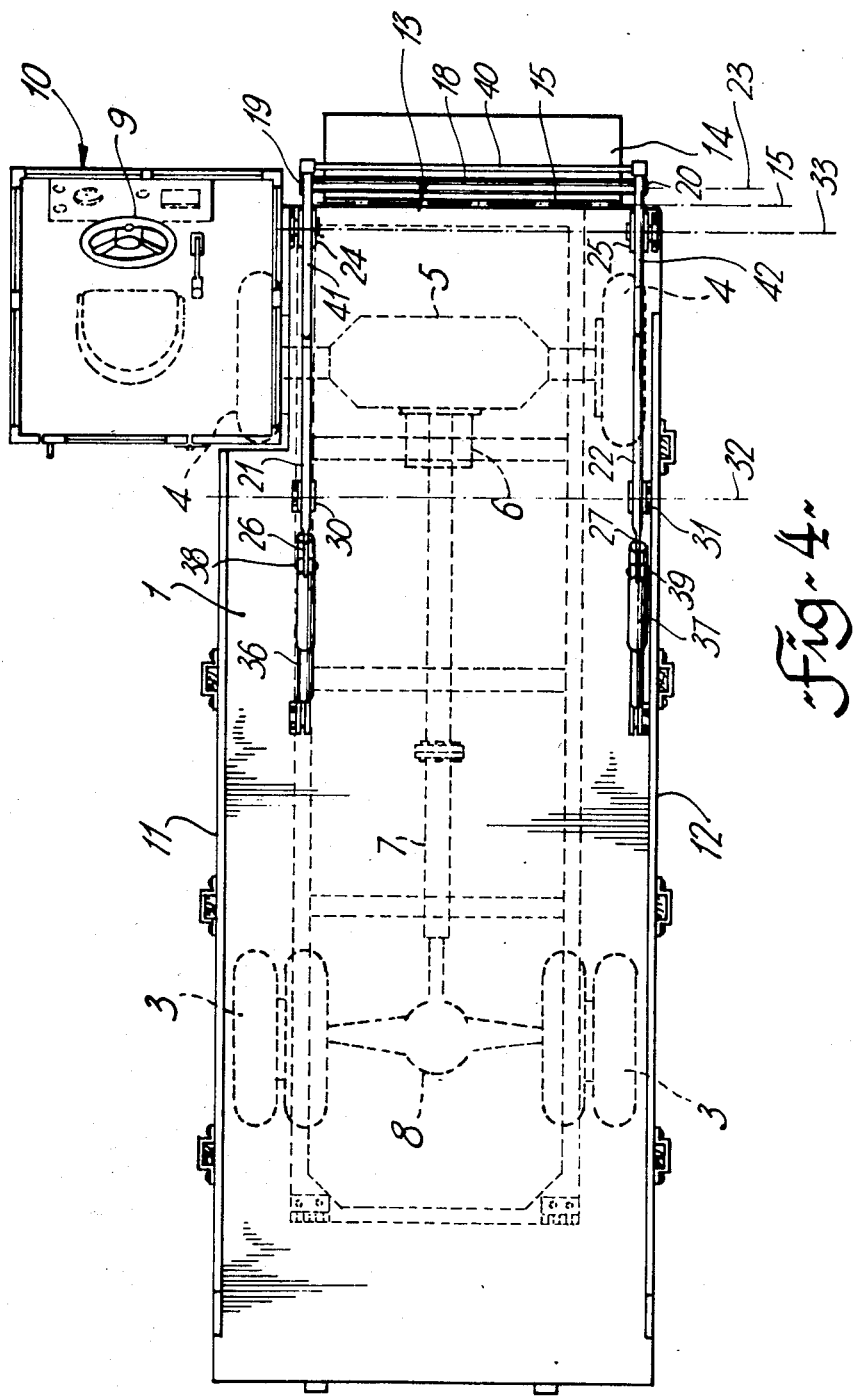

BALE LOADING ASSEMBLY

The present invention relates to a bale loading assembly for use with a bale loader for handling heavy round bales of hay or the like.

It is known that presently the preferred method of compacting hay or the like crops is that of compacting the material into round bales of a large, generally cylindrical shape, the diameter of such bale being about 4 to 5 feet and its length being approximately 5 to 6 feet, the weight of the bales being about 1 ton. In an apparatus which I designed prior to the present invention, a movable device is provided for handling these types of bales, the device being of a self-propelled type and the platform being of a self-propelling type and comprising a generally planar platform of an elongated rectangular shape the front end of such platform being used for loading of the bales onto the platform by a pivotal bale lift, the bale lift being, basically, a fork assembly extending downwardly and forwardly of the front end of the platform.

Although the above type of bale handling device is generally satisfactory in many practical applications, the bale lifting portion of same was found to lack effectiveness when operating the bale loader in a hilly or rough ground, wherein the handling of the bales by the pivotal lift tended to result in undesired rolling-off of the bales from the lift, particularly when the platform was sloped downwardly and forwardly due to the hilly terrain.

Accordingly, it is an object of the present invention to provide an attachment for the above type of bale loader which would make it suitable for work on rough and hilly ground. It is another object of the present invention to provide an attachment for the bale loader of the above mentioned type which is extremely simple in construction and thus not only relatively inexpensive to produce but also relatively undemanding with respect to maintenance and overall operation.

According to the invention, a bale loading assembly is provided for use with a bale loader for handling round bales of hay or the like, said bale loader being of the type of a mobile platform of an elongated, generally rectangular shape including two sides and a loading front end. The bale loading assembly comprises ramp means similar to the aforementioned bale lifting device. The ramp means is adapted for pivotal movement about a lateral axis generally coincident with the front end of the platform. Bale pulling means is associated with the platform and includes a laterally extending bale engagement means, such as a roller. The bale engagement means is movably secured to the platform for selective movement to achieve three basic positions. In a first position, the engagement means is located ahead of the front end of the platform and generally coplanar with the same, in other words, the bale engagement means is ahead of the platfrom and spaced above the ground. In a second position, the bale engagement means is located ahead of the front end of the platform at the ground level. In this position, the bale engagement means virtually rests on the ground. In the third position, the bale engagement means is moved to become generally coplanar with the platform and located adjacent the front end thereof.

Further features, objects and advantages of the present invention will become more apparent from the following description of a preferred embodiment of the present invention with reference to the accompanying drawings.

In the Drawings:

FIG. 1 is a side view of a bale loader in which the assembly of the present invention is shown in said first position;

FIG. 2 is a side view similar to FIG. 1 but showing the assembly in the second position;

FIG. 3 is a side view similar to FIG. 1 but showing the assembly in the third position;

FIG. 4 is top view of FIG. 1;

FIG. 5 (on the sheet of FIG. 1) is a detail V of FIG. 1; and

Figure 6:
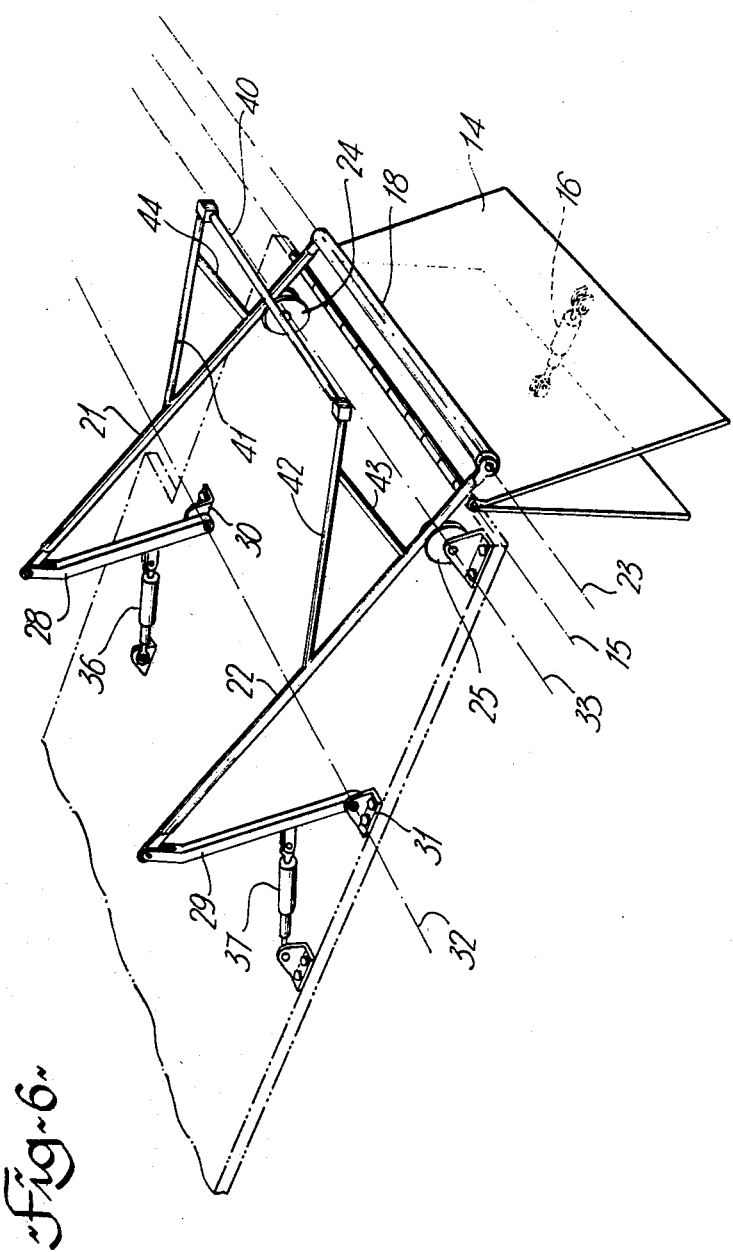
FIG. 6 is a schematic perspective view of the mechanism of the invention showing the geometry of same.

The bale loader shown in the drawings contains a platform 1 which is supported on a self-propelled chassis and the rear wheels 3 of which are driven by a combustion engine 5 via usual transmission means consisting of a gear box 6, drive shaft 7 and a differential 8. The front wheels 4 of the platform are steerable and are operatively connected with a steering wheel 9 located in operators cab 10. As best seen from FIG. 4, the platform 1 is of an elongated, generally rectangular shape, including two sides 11, 12 and a loading front end 13. Depending downwardly and forwardly from the front end 13 is a ramp 14 which is pivotal about a first lateral axis 15. It can be seen from FIGS. 1, 2 and 3 that the axis 15 is very close to the front edge of the platform 1 and can therefore be referred to as being generally coincident with the front end 13 of the platform 1. The ramp 14 is provided with hydraulic piston-cylinder motor 16 for selective movement of the ramp 14, depending on the required slope of the ramp.

The bale loader is provided with bale pulling means, generally designated with reference numeral 17 which will now be described in a greater detail. As best seen from FIG. 2, the bale pulling means includes a laterally extending roller 18 secured to free ends 19, 20 of arms 21, 22. Consequently, the roller 18 is pivotal about a lateral axis 23 (FIG. 4). Each of the arms 21, 22 is supported for pivotal-rolling movement by support rollers 24, 25, respectively. As best seen from FIGS. 1, 2 or 3, the support rollers 24, 25 are located in proximity to the forward edge of the platform 1. The ends 26, 27 of arms 21, 22 which are opposite to the free ends 19, 20 are operatively connected to drive means which is arranged to impart a simultaneous movement to the arms 21, 22 to selectively change the position of the roller 18. The ends 26, 27 are each pivotally secured to a lever 29 each of the levers 28, 29, in turn, being pivotally secured with its opposite end in a bracket 30, 31. The brackets 30, 31 are fixedly secured each to one side 11, 12 of the platform 1.

With reference to FIG. 4, the axis 32, of pivotal movement of levers 29, also referred to as a second axis, is generally coincident with the platform 1 and parallel with the axis 33 of support rollers 24, 25, the axis 33 also being referred to as a third axis.

Each of the levers 29 is provided with a bracket 34, 35 for pivotal securing of the free end of a piston rod of a hydraulic piston-cylinder motor 36, 37, the base of each of the motors 36, 37 being, of course, pivotally secured to the respective side of the platform 1.

It will thus be appreciated that the hydraulic piston-cylinder motors 36, 37, the levers 28, 29, and the arms 21, 22 are arranged in pairs, each of the pairs being arranged for a movement generally coincident with a plane perpendicular to the platform 1 and located at the respective side 11, 12 of the platform 1.

The distance between the second axis 32 and the third axis 33 is greater than the distance between the second axis 32 and the pivot joints 38, 39 between the respective levers 28, 29 and the associated arms 21, 22. Due to this arrangement, the first position as referred to hereinbefore and as shown in FIG. 1, is achieved when the levers 28, 29 are pivoted to assume the forward-most position with the pivot joints 38, 39 being generally coincident with the level of the platform 1.

Turning back to the bale pulling means 17, it will be observed that, apart from the above mentioned roller 18, the bale engaging means also includes another laterally extending rod 40 which is secured at free end of side arm 41, 42, which, in turn, are secured by welding to the arms 21, 22 of cross-pieces 43, 44. The rod 40 is thus fixedly secured to the arms 21, 22.

In operation, the piston-cylinder motors 36, 37 are actuated to pivot the levers 28, 29 to a position wherein the pivot joints 38, 39 of the levers 28, 29 are in their forwardmost position, generally coincident with the platform 1. The pivot joints 38, 39, hold the associated ends of the arms 21, 22 also near the platform. The arms being supported on support rollers 24, 25, the arms 20, 21 extend in a generally horizontal direction with the roller 18 located ahead of the front end 13 of the platform 1. The position of the roller 18 with respect to the platform can thus also be referred to as being in generally co-planar relationship with the platform 1. In this position, the platform 1 is ready to be driven to a bale resting on the ground. The platform is positioned with its front edge generally parallel with the axis of the bale, the bale itself being close to the ramp 14. The hydraulic motors 36, 37 are now actuated to pivot the levers 28, 29 in anti-clockwise direction as viewed in FIGS. 1 - 3. This movement results in gradual lifting of the pivot joints 38, 39 and of their associated ends of the arms 21, 22 whereby the forward ends of arms 21, 22 are lowered to bring the front roller 18 of the bale pulling means 17 to the ground and to a position adjacent to the side of the bale remote from the platform 1.

Further pivotal movement of the arms in anti-clockwise direction brings the bale pulling means 17 into a position shown in FIG. 3, wherein the bale engaging roller 18 is generally coincident with the front edge of the platfrom 1.

It will be appreciated from the above that during the change of the position of the bale pulling means 17 from the first position to the second position, the arms 21, 22 effect a generally pivotal movement about the axis of the rollers 24, 25 (also referred to as the third axis). The term "generally" pivotal is to be used in view of the fact, actually, the arms 21, 22 not only pivot about the third axis but also move, to a limited degree, in a direction perpendicular to the third axis.

On the other hand, when the second position is changed to the third position, the movement of the arms 21, 22 with respect to the support rollers 24, 25 (that is to say, with respect to the third axis), takes place in a generally straight direction perpendicular to the third axis. Again, the term "generally" straight implies that the straight direction of movement is predominant during this phase although some pivotal movement about the third axis inevitably takes place due to the mutual arrangement between the arms 21, 22 and the associated levers 28, 29.

It will be appreciated that in the third position, the bale has been brought onto the platform and stays on the platform without a considerable tendency to roll off same, mainly due to the overall weight of each of the bales. The bale loading assembly is now free to return to the first position via the second position and to load subsequent bale, the subsequent bale pushing the first loaded bale toward the back end of the platform.

The present invention thus provides for a very simple, relatively inexpensive and yet very effective bale loading assembly which is capable of use in a hilly terrain or the like in which the use of the merely a pivoted ramp or the like would be insufficient. The present invention, of course, can also be used in a plane terrain.

Those skilled in the art will readily conceive further embodiments different from the one disclosed above. For instance, the arms 21, 22 can be supported on support rollers 24, 25 so as to prevent the arms 21, 22 from becoming lifted from rollers 24, 25. The provision of the bale pulling means being of the type of a roller 18 is also to be considered as being merely an example. Different embodiments, such as a solid rod can also be employed, although the provision of a rolling contact of the forward end of the bale pulling means is preferable as the bale pulling means frequently touch the ground and sometimes may do so during the movement of the platform. The actual arrangement of the levers and arms of the present invention can also be replaced by a different embodiment, although it is believed that the above arrangement is the simplest and effective solution.

In view of the above, it will be seen that different modifications of the present invention as disclosed hereinbefore may still fall within the scope of this invention as defined in the accompanying claims.

The embodiments of the present invention in which an exclusive property or privilege is claimed are defined as follows:

1. Bale loading assembly for use with a bale loader for handling bales of hay or the like, said bale loader being of the type of a mobile platform of an elongated, generally rectangular shape including two sides and a loading front end, said bale loading assembly comprising:
   a. ramp means pivotally secured to said loading front end for pivotal movement about a first lateral axis generally coincident with said front end, said ramp means normally being inclined downwardly and forwardly of said front end of the platform;
   b. a first drive means operatively connected to said ramp means for selectively adjusting the inclination of said ramp means;
   c. bale pulling means including bale engagement means secured to one end of said bale pulling means and having an extended position forwardly and in a surrounding posture of said bale, a ground engaging position and a retracted position, said bale engagement means including a pair of arms for simultaneous generally pivotal movement operatively about a second lateral axis generally parallel with said first lateral axis in planes generally coincident with planes perpendicular to said platform and located adjacent to said sides of the platform, said pair of arms having free ends, and said bale engagement means further including ground engagement means mounted on free ends of said pair of arms;
   d. second drive means operatively connected to said bale pulling means for selectively displacing said bale engagement means from said extended position wherein said bale engagement means is located ahead of said front end in a generally co-planar relationship with said mobile platform, to said ground engaging portion, wherein said bale engagement means is located ahead of said front end at the ground level, and to said retracted position wherein said bale engagement means is generally co-planar with said platform and located on said platform adjacent said front end thereof, said second drive means further including a pair of levers, each of said pair of levers being secured with its one end, to one side of the platform for pivotal movement about said second lateral axis and in a plane generally perpendicular to said platform and located at the respective side thereof, the opposite end of each of said levers being pivotally secured by a pivot joint to the respective ends of said arms remote from said free ends thereof; and e. guide means operatively connected to said bale pulling means to guide movement of said bale engagement means from said ground engaging position to said retracted position along a locus generally parallel with the inclination of said ramp means.

2. An assembly as claimed in claim 1 in which said ground engagement means includes a roller rotatably supported on the free ends of said pair of arms.

3. An assembly as claimed in claim 1 including motor means for selectively and simultaneously pivoting said levers about the second axis.

4. An assembly as claimed in claim 1 wherein said guide means further includes means for changing location of said bale engagement means from said extended position to said ground engaging position by a generally pivotal movement of said bale pulling means about a third lateral axis generally coincident with the front end of said platform.

5. An assembly as claimed in claim 4 including means to support each of said pair of arms for pivotal sliding movement, said support means being located on said third axis.

6. An assembly as claimed in claim 5, wherein the distance between said second axis and the axis of pivot joints at which each of the respective levers is pivotally secured to the associated arm is shorter than the distance between said second axis and said third axis, whereby said first position is achieved when said levers are turned into a forwardmost position in which said pivot joints are generally coincident with said platform.

7. An assembly as claimed in claim 6, wherein said bale engagement means further includes a laterally extending rod. generally parallel with and spaced above said roller, said rod being fixedly secured to said arms.

* * * * *